United States Patent Office 2,887,991
Patented May 26, 1959

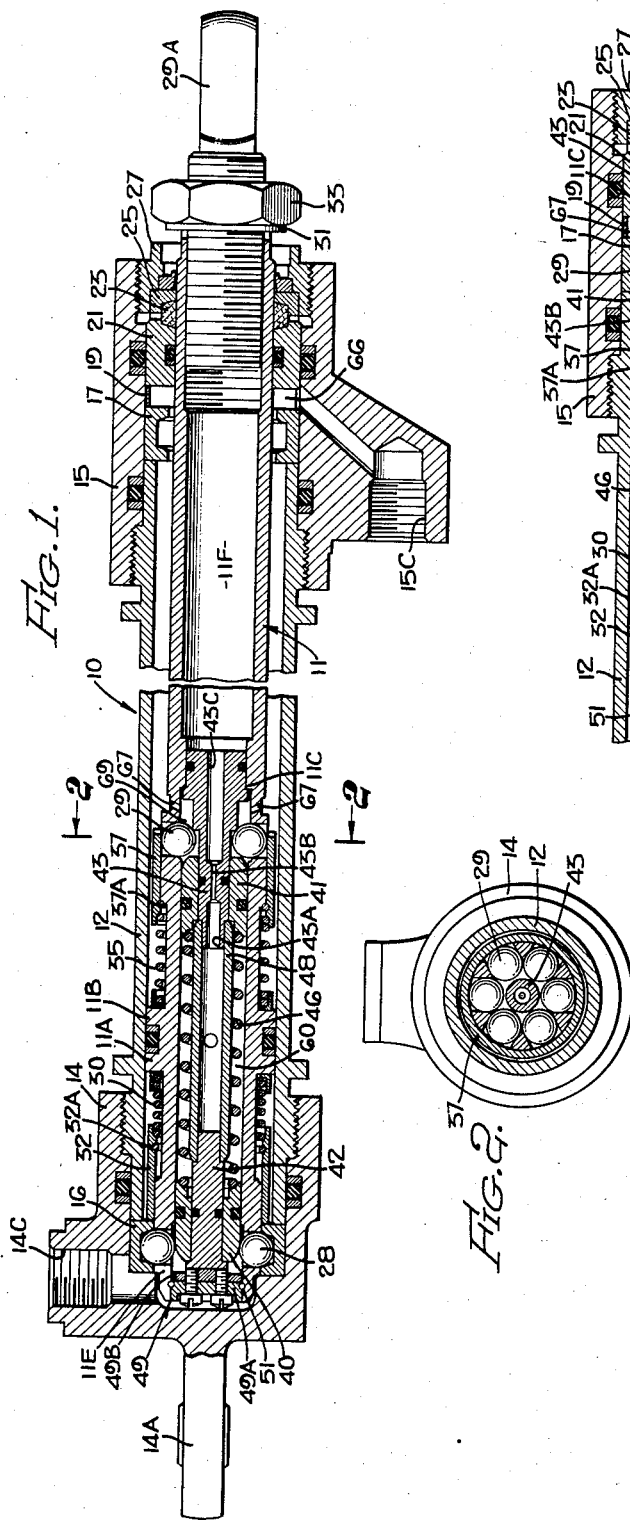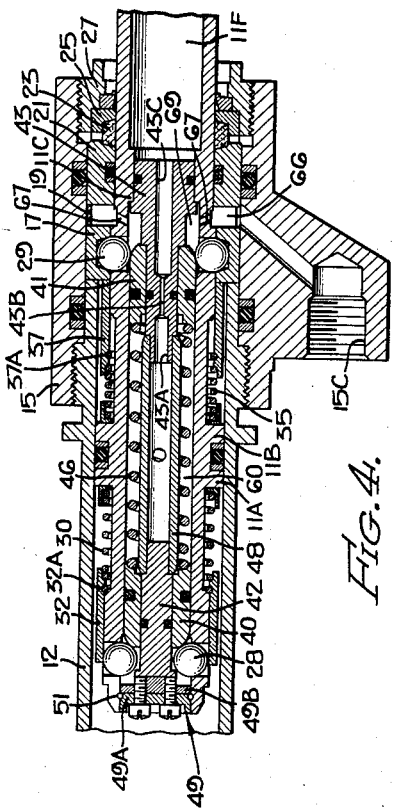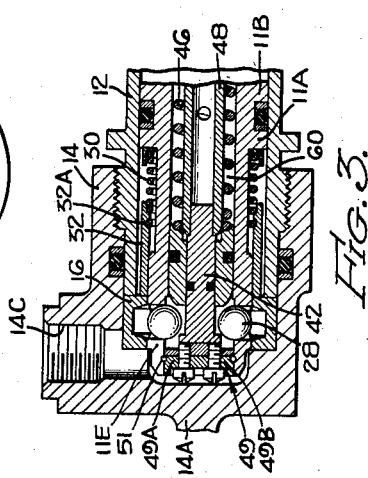

2,887,991

FLUID ACTUATOR WITH LOCKING MEANS

Don W. Driskel, Glendale, and Richard L. Hayman, Flintridge, Calif., assignors to Haskel Engineering Associates, Glendale, Calif., a copartnership Application March 29, 1954, Serial No. 419,462

5 Claims. (Cl. 121—40)

The present invention relates to improvements in hydraulic or pneumatic actuators, and more specifically to a structure of that type which incorporates means for automatically locking an element thereof in an operative position after movement of such element, and in general the present application constitutes an improvement on the structures disclosed in our copending United States patent applications, Serial No. 241,472 filed August 11, 1951 (now abandoned), and in a divisional application thereof, Serial No. 388,408 filed October 26, 1953 which matured as Patent No. 2,713,328 on July 19, 1955.

Hydraulic or pneumatic actuators of this character include a piston slidably mounted in a cylinder. The piston is moved to different operating positions in accordance with fluid, either air, oil or the like, being applied under pressure to the cylinder. The present invention contemplates the provision of an improved mechanism disposed entirely in the cylinder for locking the piston in one or more of its operating positions. The locking mechanism is automatically released upon application of pneumatic or fluid pressure to the cylinder. More specifically, the present invention contemplates the use of one or more balls for accomplishing this general purpose, which coact in a novel manner, using improved mechanism.

One of the objects of the present invention is to provide an improved hydraulic or pneumatic actuator of this character which incorporates an improved locking mechanism.

Another specific object of the present invention is to provide an improved arrangement of this character featured by the fact that elements are arranged on the inner locking piston in such a manner as to provide a better balanced condition so as to reduce the amount of spring force required in providing a lock.

Another specific object of the present invention is to provide an improved ball lock arrangement of this character in which, due to the improved balanced construction, the spring force required to operate the balls is materially reduced, thereby allowing smaller and lighter springs and allowing lower operating pressures.

Another important specific object of the present invention is to provide an improved mechanism of this character which incorporates a movable tapered spring biased sleeve cooperating with the balls to achieve those advantages mentioned in the next two preceding paragraphs.

Another specific object of the present invention is to provide a mechanism of this character which incorporates a tapered sleeve which fits tightly in peripherally arranged balls so as to remove substantially all endwise play or movement in the locked position, a result heretofore not obtainable in a practical manner with the structures described in our above-mentioned patent applications.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a longitudinal sectional view through an actuator embodying features of the present invention showing the piston locked at one of its ends of travel.

Figure 2 is a sectional view taken substantially on the line 2—2 of Figure 1.

Figure 3 is a sectional view of a portion of the structure illustrated in Figure 1 but with the piston unlocked from the outer cylinder.

Figure 4 is a sectional view corresponding to the sectional view shown in Figure 1 but with the piston at its other end of travel wherein it is locked.

In general, the actuator includes a stationary cylinder 10 within which is slidably mounted the piston 11, the piston being movable under the influence of hydraulic pressure between two extreme positions, in either one of which it is automatically locked by a series of balls carried on the piston and engageable with cooperating locking rings mounted on the cylinder.

The cylinder 10 includes generally an elongated barrel 12 which has screw threaded on opposite ends thereof the end caps 14 and 15.

The ball receiving ring 16 is stationarily held between cooperating spaced shoulders on the barrel 12 and end cap 14; and the other ball receiving ring 17 is in similar manner maintained stationarily between spaced shoulders of the barrel 12 and the spacer ring 19 which is backed up to remain stationary by the following elements, namely, spacer ring 19, ring 21, packing or gasket means 23, gasket retaining ring 25 and the plug 27 threaded internally in the end cap 15.

The piston 11 loosely mounts a first series of balls 28 adapted to cooperate with the locking ring 16, and a second series of balls 29 adapted to cooperate with the locking ring 17 as illustrated in Figure 4, there being six balls in each series, as shown in Figure 2, loosely retained in six radially extending bores in the piston 11.

The end cap 14 is provided with an integrally formed mounting ring 14A and the piston 11 is internally threaded to receive the threaded actuating eye or ring 29A, such eyelet 29A being firmly attached to the piston 11 using the lock washer 31 and locking nut 33.

The piston 11 is provided with a pair of annularly spaced shoulders 11A and 11B serving as abutments for the coil compression springs 30 and 35, one end of the spring 30 bearing against the sleeve 32 to bias the same to the left in Figure 1; and similarly, one end of the spring 35 bears against the sleeve 37 to normally bias the same to the right in Figure 1; such sleeves 32 and 37 serving as ball retaining rings or sleeves while the piston moves between its extreme positions, and for that purpose being slidably mounted on the piston 11. Such sleeves 32 and 37 are provided with stops in the form of recessed locking rings 32A and 37A, each adapted to engage different spaced shoulders on the piston 11 to thereby limit their movement.

These sleeves 32 and 37 serve generally to limit radial outward movement of the corresponding series of balls 28 and 29 when such balls are not in position to enter their corresponding locking rings 16 and 17, but such retaining rings 32 and 37 are automatically moved out of ball retaining position when and as the balls reach their corresponding ball receiving rings 16 and 17. For that purpose, the ball retaining sleeve 32 is engageable with the ball receiving ring 16, and the ball retaining sleeve 37 is likewise engageable with the ball receiving ring 17.

The series of balls 28 are, under certain conditions, moved radially outwardly with respect to the piston in which they are loosely mounted by the ball actuating sleeve 40, and similarly, the series of balls 29 are, under certain conditions, moved radially with respect to the axis of the piston 11 by the ball actuating sleeve 41.

These ball actuating sleeves 40 and 41 are each slidably mounted on corresponding plugs 42 and 43, such plugs 42 and 43 being stationarily mounted with respect to the piston 11. The ball actuating sleeves 40 and 41 thus slidably mounted are urged in opposite directions by the prestressed coil compression spring 46 and movement of such sleeves 40 and 41 may be limited either by shoulders on the corresponding plugs 42 and 43 or by their engagement with the ball 16 under different conditions.

These plugs 42 and 43 are stationarily mounted with respect to the piston ring, having the following construction. The plug 43 has a shoulder thereon engageable with the annular shoulder 11C of the piston 11, and such plug 43 abuts one end of the tube 48 having its other end abutting in similar manner the shoulder on the plug 42. Such plug 42 in turn abuts the disc element 49 which actually comprises a pair of discs 49A and 49B bolted together and retained within the bore of the piston element 11 by the retaining ring 51.

The end cap 14 is provided with a fluid inlet 14C through which fluid is introduced under pressure for first unlocking the piston assembly from the cylinder assembly and for thereafter subsequently moving such piston 11 to the right in Figure 1. Likewise, the end cap 15 is provided with a fluid inlet 15C through which liquid under pressure may be introduced to unlock the piston assembly from the cylinder assembly (when such piston assembly is in its locked position illustrated in Figure 4) to first cause automatic unlocking of the piston and thereafter subsequently moving the piston to the left in Figures 1 and 4.

For these purposes, the aforementioned ball actuating sleeves 40 and 41 serve as part of a subpiston-cylinder assembly in which the actuating sleeves 40 and 41 may be termed subpistons and the piston 11 itself termed a sub-cylinder.

Fluid under pressure entering the conduit or inlet 14C flow through a series of apertures 11E in the piston 11, and the pressure of such fluid is applied to the sleeve 40 which serves as a subpiston to move it to the right in Figure 1, to thereby allow the series of balls 28 to move radially inwardly with respect to the piston 11 and out of the ball receiving ring 16 whereby the piston 11 is no longer locked with respect to the cylinder 10 such that, with continued application of fluid pressure acting on the piston 11, the piston 11 is moved to the right in Figure 1, and during such movement of the piston from the positions illustrated in Figures 1 and 4, ball retaining sleeves 32 and 37 automatically, under the influence of the corresponding springs 30 and 35, retain the balls within the piston. However, when and as the ball retaining sleeve 37 engages the ring 17, the series of balls 29 are then free to move outwardly into the annular groove within the locking ring 17 wherein they are urged by the actuating sleeve 41, such sleeve 41 having an axial force applied thereto from the other hydraulically pressed sleeve 40 through the interconnecting spring 46. This double-acting centrally-arranged structure, in accordance with important features of the present invention, includes the sleeves 40 and 41 each being tapered at their ball-engaging ends. Tapering of such sleeves 40 and 41 results in the corresponding series of balls 28 and 29 being cammed radially outwardly gradually, thereby greatly minimizing the force required, but of greater importance is the fact that tapering the sleeves 40 and 41 results in a rigid locked structure which is substantially free of end play. By this simple expedient of tapering the sleeves 41 and 40, dimensional tolerances are not of as great importance as is otherwise the case, but more important a rigid structure substantially free from end play results, and a relatively simple structure is permitted wherein hydraulic force applied to one of the sleeves may be transmitted through the relatively weak spring 46 to the other sleeve 41 to move the series of balls 29 radially outwardly in locked position.

It is noted that the annular space between the sleeves 40 and 41 and occupied by the spring 46 is free from the hydraulic actuating fluid, and such space is vented to a relatively large air chamber 11F constituting a bore in the piston 11, through interconnecting channels 43A, 43B and 43C in the plug 43. The flow of air between the annular space 60 (defined by the sleeves 40 and 41) into the larger chamber 11F during operation of the device is effectively metered by the smaller channel 43B so that the size of the channel 43B governs to a certain extent relative movement of the sleeves 40 and 41 under different conditions.

In operation, assuming that the device is locked in the position illustrated in Figure 1, liquid under pressure is introduced in the conduit 14C and such liquid initially causes the sleeve 40 to move to the right in Figure 1 to allow the balls 16 to move out of their locking position and subsequently, under continued application of pressure to the conduit 14C, the piston 11 moves to the right. When and as the balls 29 reach their locking ring 17, the ball retaining sleeve 37 is engaged by the ring 17 and such sleeve 37 then remain stationary to allow the radial apertures in the piston 11 to be exposed so that the series of balls 29 may be pressed radially outwardly by the sleeve 41 into the annular groove in the ring 17. When this condition is achieved, further continued application of pressure through conduit 14C has no effect on movement of the piston and such piston remains in locked position even though the pressure in conduit 14C is relieved. Thus, under this condition illustrated in Figure 4, the piston 11 may be returned to the left only upon application of pressure to the conduit 15C to obtain the same type of operation mentioned previously. Such fluid under pressure applied to the conduit 15C flows into the annular space 66 through the series of radial channels 67 and into the annular space 69 wherein it is effective to cause the sleeve 41 to move to the left to allow the series of balls 29 to move radially inwardly wherein their movement is limited by their engagement with the plug 43.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, a fluid pressure cylinder, a piston slidably mounted in said cylinder, said piston having an annular ring portion, said ring portion having two spaced series of apertures therein, a locking ball in each one of said apertures, said balls having a diameter greater than the thickness of said ring-shaped portion, a pair of members movably mounted internally of said ring-shaped portion for movement therein, said members being engageable with said balls in a corresponding one of said series of apertures to move said balls radially outwardly of said ring-shaped portion, and spaced means mounted on said cylinder and circumscribing said ring-shaped portion for engaging said balls in corresponding series of apertures to move the same radially inwardly with respect to said ring-shaped portion, each of said members having a cam surface thereon engageable with said balls to cam said balls radially outwardly, each of said members having a portion of reduced diameter on said cam surface engageable with said balls to retain the same in said apertures, and spring means acting between each of said members tending to urge the cam surface and said portion of reduced diameter on each in engagement with said balls to provide movement of said balls and to positively press said balls into engagement with said spaced means to thereby prevent end play between the piston and the cylinder in the locked condition.

2. The arrangement set forth in claim 1 in which said pair of members are slidably mounted on a portion of said piston, conduit means on said cylinder for introducing fluid under pressure to said members to move the same relative to said piston.

3. In an arrangement of the character described, a cylinder having a pair of spaced locking rings mounted internally thereof and relatively stationary with respect to said cylinder, a piston slidably mounted in said cylinder, said piston having a pair of spaced series of reentrant portions, a first series of balls in one of said plurality of said reentrant portions, a second series of balls in the other of said plurality of reentrant portions, said first series of balls being adapted to cooperate with said first locking ring and said second series of balls being adapted to cooperate with said second locking ring, a pair of sleeves slidably mounted internally of said piston and each having a cam surface thereon engageable with a corresponding series of said balls, common spring means acting between said sleeves tending to move the cam surfaces of said sleeves into engagement with a corresponding series of said balls, said spring means serving in the locked position of the piston to press a portion of said cam surface into engagement with said ball to provide a positive connection between said piston and said cylinder to thereby prevent end play between the same in said locked position.

4. The arrangement set forth in claim 3 in which a pair of ball retaining sleeves are slidably mounted externally of said piston, and spring means acting between said piston and said ball retaining sleeves tending to close said pair of series of reentrant portions to thereby confine the balls within the piston, and each of said ball retaining sleeves being engageable with a corresponding one of said locking rings on said cylinder.

5. The arrangement set forth in claim 3 in which said piston is provided with an enlarged internal chamber which is maintained free of the fluid that is used to actuate said sleeves, and a restricted orifice communicating opposite and adjacent sides of said sleeves with said enlarged chamber.

References Cited in the file of this patent

UNITED STATES PATENTS

| | | |
|---|---|---|
| 2,295,961 | Meyer | Sept. 15, 1942 |
| 2,393,962 | Ashton | Feb. 5, 1946 |

FOREIGN PATENTS

| | | |
|---|---|---|
| 362,577 | Italy | Aug. 30, 1938 |
| 493,471 | Great Britain | Oct. 10, 1938 |
| 715,461 | Germany | Dec. 22, 1941 |
| 866,757 | Germany | Feb. 12, 1953 |